(12) United States Patent
Rowe

(10) Patent No.: US 7,762,888 B2
(45) Date of Patent: *Jul. 27, 2010

(54) GAME ORIENTED PROMOTIONAL CARD

(75) Inventor: Richard E. Rowe, Incline Village, NV (US)

(73) Assignee: IGT, Reno, NV (US)

( * ) Notice: Subject to any disclaimer, the term of this patent is extended or adjusted under 35 U.S.C. 154(b) by 1193 days.

This patent is subject to a terminal disclaimer.

(21) Appl. No.: 10/661,095

(22) Filed: Sep. 12, 2003

(65) Prior Publication Data

US 2004/0110557 A1 Jun. 10, 2004

Related U.S. Application Data

(63) Continuation-in-part of application No. 09/924,250, filed on Aug. 7, 2001, now Pat. No. 6,969,319.

(51) Int. Cl.
*G06F 19/00* (2006.01)
(52) U.S. Cl. .............................. 463/29; 463/16; 463/20; 463/42; 273/138.1; 273/138.2; 705/14.12
(58) Field of Classification Search ............. 463/17–22, 463/24–25, 29, 33, 42–43, 47, 16, 26–28; 273/138.1, 138.2, 141 A, 269, 454–456, 460; 283/40; 700/91–93; 705/14.1, 14.12, 14.22, 705/14.3, 14.38; *G06F 19/00*
See application file for complete search history.

(56) References Cited

U.S. PATENT DOCUMENTS

| | | | | | |
|---|---|---|---|---|---|
| 4,322,612 | A | * | 3/1982 | Lange | 463/28 |
| 4,575,622 | A | * | 3/1986 | Pellegrini | 463/25 |
| 4,669,730 | A | * | 6/1987 | Small | 463/17 |
| 4,764,666 | A | * | 8/1988 | Bergeron | 463/25 |
| 4,882,473 | A | * | 11/1989 | Bergeron et al. | 463/25 |
| 5,038,022 | A | * | 8/1991 | Lucero | 463/25 |
| 5,069,453 | A | * | 12/1991 | Koza et al. | 463/17 |
| 5,080,364 | A | | 1/1992 | Seidman | |
| 5,129,652 | A | | 7/1992 | Wilkinson | |
| 5,179,517 | A | * | 1/1993 | Sarbin et al. | 463/25 |

(Continued)

FOREIGN PATENT DOCUMENTS

DE 3441518 A1 5/1986

(Continued)

OTHER PUBLICATIONS

Rowe, Richard E., IGT, Utility Patent Application Titled: *Game Oriented Promotional Card*, U.S. Appl. No. 09/924,250, filed Aug. 7, 2001.

(Continued)

*Primary Examiner*—Peter DungBa Vo
*Assistant Examiner*—Arthur O. Hall
(74) *Attorney, Agent, or Firm*—Weaver Austin Villeneuve & Sampson LLP

(57) ABSTRACT

A promotional device and methods for using such a device are described. The promotional device can be used to effect operation of a specific gaming application on a gaming machine. The promotional device has associated with it both indicia of credit and a specific player. Operation of the specific gaming application is limited to the credit and the specific player associated with the promotional device.

32 Claims, 4 Drawing Sheets

U.S. PATENT DOCUMENTS

| | | | | |
|---|---|---|---|---|
| 5,231,568 A * | 7/1993 | Cohen et al. | | 463/17 |
| 5,265,874 A * | 11/1993 | Dickinson et al. | | 463/25 |
| 5,276,312 A * | 1/1994 | McCarthy | | 463/26 |
| 5,326,104 A | 7/1994 | Pease et al. | | |
| 5,417,424 A * | 5/1995 | Snowden et al. | | 463/18 |
| 5,429,361 A * | 7/1995 | Raven et al. | | 463/25 |
| 5,557,086 A | 9/1996 | Schulze et al. | | |
| 5,593,349 A * | 1/1997 | Miguel et al. | | 463/30 |
| 5,643,086 A | 7/1997 | Alcorn et al. | | |
| 5,761,647 A | 6/1998 | Boushy | | |
| 5,768,382 A | 6/1998 | Schneier et al. | | |
| 5,871,398 A | 2/1999 | Schneier et al. | | |
| 5,917,725 A * | 6/1999 | Thacher et al. | | 700/91 |
| 5,919,091 A * | 7/1999 | Bell et al. | | 463/25 |
| 5,967,896 A | 10/1999 | Jorasch et al. | | |
| 6,019,283 A | 2/2000 | Lucero | | |
| 6,086,477 A * | 7/2000 | Walker et al. | | 463/17 |
| 6,104,815 A | 8/2000 | Alcorn et al. | | |
| 6,106,396 A | 8/2000 | Alcorn et al. | | |
| 6,110,044 A | 8/2000 | Stern | | |
| 6,113,098 A | 9/2000 | Adams | | |
| 6,113,495 A * | 9/2000 | Walker et al. | | 463/42 |
| 6,149,522 A | 11/2000 | Alcorn et al. | | |
| 6,227,972 B1 * | 5/2001 | Walker et al. | | 463/25 |
| 6,251,017 B1 * | 6/2001 | Leason et al. | | 463/42 |
| 6,254,006 B1 * | 7/2001 | Mish | | 235/492 |
| 6,264,561 B1 * | 7/2001 | Saffari et al. | | 463/42 |
| 6,309,298 B1 * | 10/2001 | Gerow | | 463/20 |
| 6,340,331 B1 * | 1/2002 | Saunders et al. | | 463/25 |
| 6,352,479 B1 * | 3/2002 | Sparks, II | | 463/42 |
| 6,500,067 B1 * | 12/2002 | Luciano et al. | | 463/25 |
| 6,511,377 B1 * | 1/2003 | Weiss | | 463/25 |
| 6,527,638 B1 * | 3/2003 | Walker et al. | | 463/25 |
| 6,547,664 B2 * | 4/2003 | Saunders | | 463/25 |
| 6,575,835 B1 * | 6/2003 | Mishina et al. | | 463/42 |
| 6,679,775 B1 * | 1/2004 | Luciano et al. | | 463/25 |
| 6,729,956 B2 * | 5/2004 | Wolf et al. | | 463/25 |
| 6,979,267 B2 * | 12/2005 | Leen et al. | | 463/42 |
| 7,162,036 B2 * | 1/2007 | Rowe | | 380/251 |
| 2002/0047044 A1 * | 4/2002 | Orus et al. | | 235/380 |
| 2002/0111210 A1 * | 8/2002 | Luciano et al. | | 463/29 |
| 2002/0119824 A1 * | 8/2002 | Allen | | 463/42 |
| 2003/0031321 A1 | 2/2003 | Mages | | |
| 2004/0023711 A1 * | 2/2004 | Knapp | | 463/17 |

FOREIGN PATENT DOCUMENTS

| | | |
|---|---|---|
| DE | 44 22 370 A1 | 1/1996 |
| EP | 0 369 0613 | 9/1989 |
| EP | 0 805 424 A2 | 11/1997 |
| EP | 1 094 425 A2 | 4/2001 |
| EP | 1 139 310 A2 | 10/2001 |
| GB | 2 241 098 A | 8/1991 |
| GB | 2 296 361 A | 6/1996 |
| GB | 2 374 191 A | 10/2002 |
| WO | WO 94/16781 | 8/1994 |
| WO | WO 95/10824 | 4/1995 |
| WO | WO 95/24689 | 9/1995 |
| WO | WO 96/00950 | 1/1996 |
| WO | WO 02/23491 A2 | 3/2002 |
| WO | WO 02/23496 A2 | 3/2002 |
| WO | WO 02/41963 A2 | 5/2002 |
| WO | WO 03/015299 | 2/2003 |

OTHER PUBLICATIONS

Australian First Exam Report dated Aug. 12, 2009 issued in Application No. 2004275287, 2 pgs.

* cited by examiner

GAME ORIENTED PROMOTIONAL CARD

CROSS-REFERENCE TO RELATED APPLICATIONS

This application is a continuation-in-part of and claims priority from U.S. patent application Ser. No. 09/924,250 entitled "GAME ORIENTED PROMOMOTIONAL CARD," by Rowe et al., filed on Aug. 7, 2001, now U.S. Pat. No. 6,969,139 which is incorporated by reference herein in its entirety for all purposes.

BACKGROUND OF THE INVENTION

This invention relates to gaming network including gaming machines such as video slot machines and video poker machines. More specifically, the present invention provides methods and apparatus for promoting use of a particular gaming machine or set of gaming machines to specific players. Still more specifically, mechanisms are provided by which game-specific credits may be distributed to specific players.

Traditionally, promotional cards with stored gaming credits have been provided to visitors in a gaming venue such as a casino for the purpose of promoting play across the spectrum of gaming machines at the venue. That is, the visitor, who might be, for example, a frequent customer, might be given such a promotional card as a reward for the visitor's past patronage and as an inducement for continued patronage. The visitor can then use the card and its credits in any gaming machine of her choosing.

While this mechanism may be useful for generating customer loyalty to a particular venue or chain of venues, it has not been effective for precisely directing customer behavior with respect to specific gaming machines or groups of gaming machines. Instead, if a casino or gaming machine manufacturer wanted to encourage customers to play to a new game, only standard marketing mechanisms, e.g., signage, advertising, have typically been employed. As will be understood, the fact that conventional promotional cards allow the customer to play any of the available gaming machines at a gaming establishment makes such cards ill-suited for promoting play of a specific gaming machine.

It is therefore desirable to provide a mechanism by which use of a specific gaming machine or group of gaming machines may be promoted.

SUMMARY OF THE INVENTION

According to the present invention, mechanisms are provided by which the use of a particular gaming machine or group of gaming machines may be promoted to specific players. That is, specific embodiments of the present invention enable the distribution and use of game-specific and player-specific credits. More specifically, the present invention provides promotional devices and methods for using such a devices. The promotional device, which is associated with a specific player, has indicia of credit associated therewith for effecting operation of a specific gaming application on a gaming machine which is in communication with the promotional device. The promotional device identifies the specific player and the specific gaming application and limits use of the credit thereto.

A further understanding of the nature and advantages of the present invention may be realized by reference to the remaining portions of the specification and the drawings.

DETAILED DESCRIPTION OF SPECIFIC EMBODIMENTS

Figure 1:
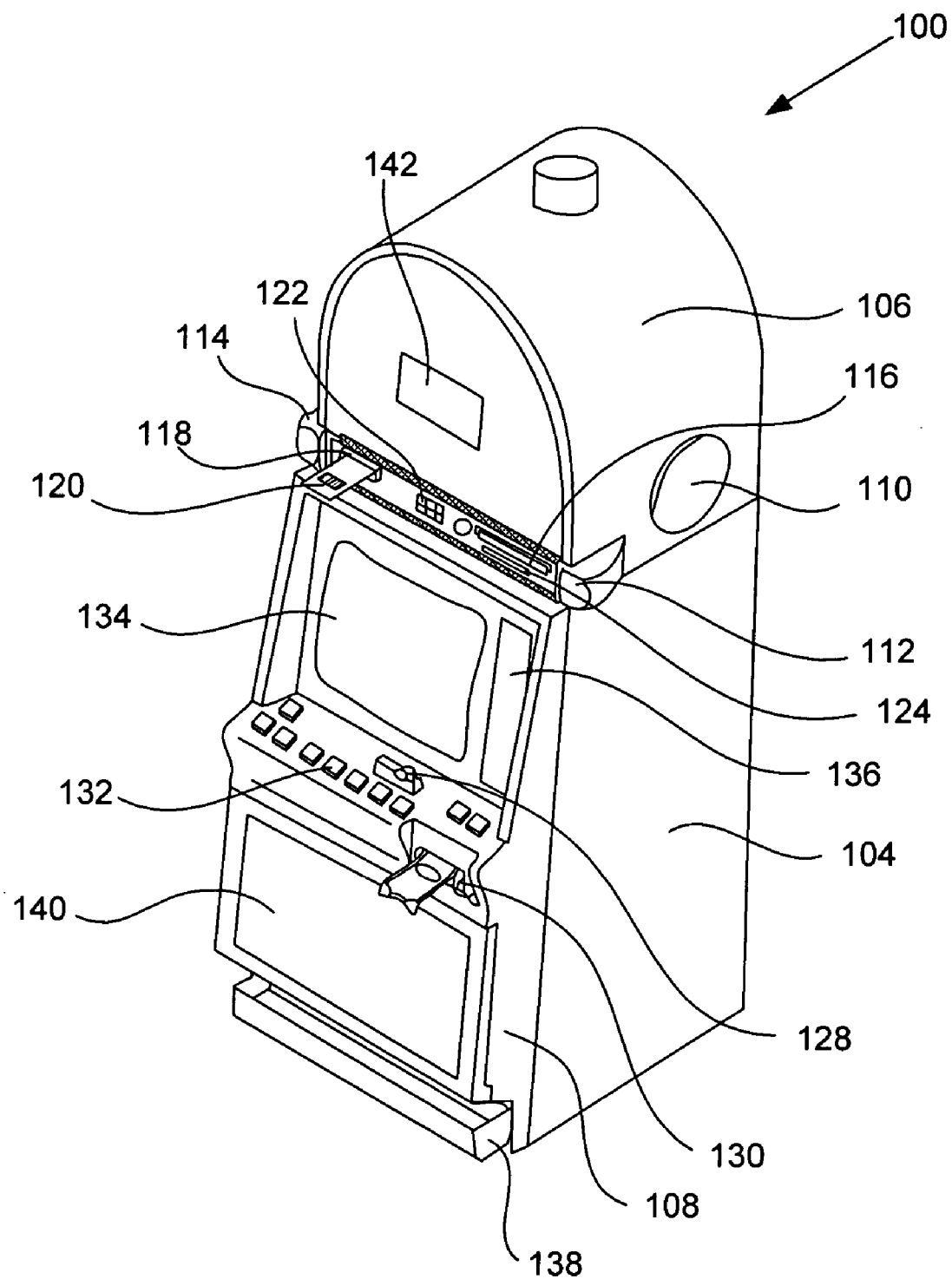
FIG. 1 is a perspective view of a gaming machine for use with specific embodiments of the present invention.

Turning first to FIG. 1, a video gaming machine 100 will be described with which various embodiments of the present invention may be practiced. Machine 100 includes a main cabinet 104, which generally surrounds the machine interior (not shown) and is viewable by users. The main cabinet includes a main door 108 on the front of the machine, which opens to provide access to the interior of the machine. Attached to the main door are player-input switches or buttons 132, a coin acceptor 128, and a bill validator 130, a coin tray 138, and a belly glass 140. Viewable through the main door is a video display monitor 134 and an information panel 136. The display monitor 134 will typically be a cathode ray tube, high resolution flat-panel LCD, or other conventional electronically controlled video monitor. The information panel 136 may be a back-lit, silk screened glass panel with lettering to indicate general game information including, for example, the number of coins played. The bill validator 130, player-input switches 132, video display monitor 134, and information panel are devices used to play a game on the game machine 102. The devices are controlled by circuitry (not shown) housed inside the main cabinet 104 of the machine 100. Many possible games, including traditional slot games, video slot games, video poker, and video keno, may be provided.

The gaming machine 100 includes a top box 106, which sits on top of the main cabinet 104. The top box 106 houses a number of devices, which may be used to add features to a game being played on the gaming machine 100, including speakers 110, 112, 114, a ticket printer 118 which may print bar-coded tickets 120, a key pad 122 for entering player tracking information, a florescent display 116 for displaying player tracking information, a card reader 124 for entering a magnetic striped card containing player tracking information. Further, the top box 106 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 104 of the machine 100.

Understand that gaming machine 100 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

When a user wishes to play the gaming machine 100, he or she inserts cash through the coin acceptor 128 or bill validator 130. In addition, the player may use a cashless instrument of some type to register credits on the gaming machine 100. For example, the bill validator 130 may accept a printed ticket voucher, including 120, as an indicia of credit. As another example, the card reader 124 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 100 is located or the ticket may have been generated at another property for example a second casino.

The cashless instrument typically contains information used to register credits on the gaming machine, including gaming machine 100, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 100. The promotional prize may involve multiple properties and particular types of gaming machines.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 120, may be printed from a printer, including printer 118. In the case of the smart card or debit card, the generation of the smart card or debit card refers to storing or encoding this information on the smart card or debit card. The generation of the debit card or smart card may occur when the smart card or debit card is inserted into the card reader 124 in the gaming machine 100 or at another site where smart cards or debit cards are issued. For example, smart cards or debit cards may be generated at ATM like terminals, at a cashier station when a player cashes out or prepaid smart cards or debits may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 132, the video display screen 134 or using some other device which enables a player to input information into the gaming machine. During certain game events, the gaming machine 100 may display visual and auditory effects that can be perceived by the player. These effects add to the excitement of a game, which makes a player more likely to continue playing. Auditory effects include various sounds that are projected by the speakers 110, 112, 114. Visual effects include flashing lights, strobing lights or other patterns displayed from lights on the gaming machine 100 or from lights behind the belly glass 140.

After the player has completed a game, a cashless instrument may be generated at the gaming machine 100. The cashless instrument may be a printed ticket voucher, a smart card, debit card or other cashless medium. For example, the player may decide to cashout and may receive the ticket 120 from the printer 118, which may be used for further games or to redeem a prize. Further, the player may receive a ticket 120 for food, merchandise, game services or other promotions from the printer 118 that may be used at the gaming property where the gaming machine is located or at other gaming properties. The player may view cashless instrument transaction information on the video display screen 134 or the florescent screen 116. For instance, when a player cashes out from the gaming machine, the value stored on the cashless instrument may be displayed using the video display 134. As another example, when a promotion ticket 120 is printed out from the printer 118 that is valid at a number of other gaming properties, a map may be displayed on the video display screen indicating where the other gaming properties are located.

As will become clear, any of the cashless instruments or mechanisms described herein may be used to facilitate the various embodiments of the invention by which game-specific and player-specific credits are distributed and used.

Figure 2:
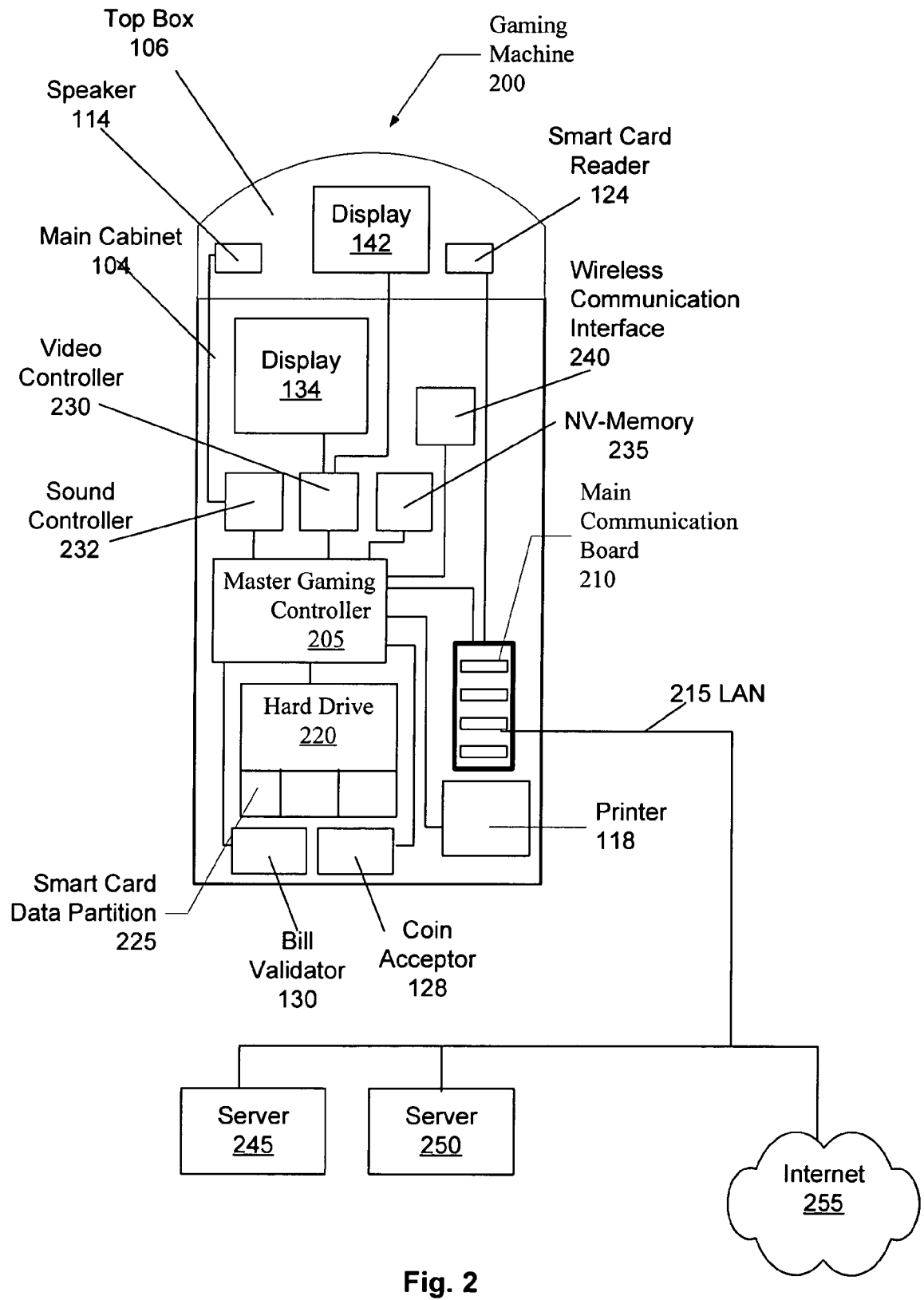
FIG. 2 is a simplified block diagram of a gaming machine and gaming network in which various embodiments of the present invention may be implemented.

FIG. 2 includes a block diagram of the components of a gaming machine 200 for use with various embodiments of the present invention in which the gaming machine is connected to a local area network 215. Components that appear in gaming machine 100 of FIG. 1 are identified by common reference numerals. A master gaming controller 205 controls the operation of the various gaming devices and the game presentation on the gaming machine 200. Using a game code and graphic libraries stored on the gaming machine 200, the master gaming controller 205 generates a game presentation which is presented on the displays 134 and 142. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 134, a player is able to visually determine the outcome of the game.

Each frame in a sequence of frames in a game presentation is temporarily stored in a video memory located on the master gaming controller 205 or alternatively on the video controller 230. The gaming machine 200 may also include a video card (not shown) with a separate memory and processor for performing graphic functions on the gaming machine 200. Typically, the video memory includes one or more frame buffers that store frame data that are sent by the video controller 230 to the display 134 or the display 142.

The frame data stored in the frame buffer provide pixel data (image data) specifying the pixels displayed on the display screen. The master gaming controller 205, according to the game code, may generate each frame in one of the frame buffers by updating the graphical components of the previous frame stored in the buffer. In a similar manner, the master gaming controller 205 may generate audio components that are output to a speaker 114 using the sound controller 232.

The video and audio components of a game presentation, as well as the configuration of the gaming machine during game play, may be affected by game components stored on a smart card or by gaming instructions generated by applications executing on the smart card. Game graphic components and game sound components may be downloaded from memory on the smart card via the smart card reader 124. For instance, images stored on the smart card, in a graphics format such as MPEG, may include player-specific images. Sounds stored on the smart card, in a sound format such as MP-3, may include, for example, one or more of a player's favorite songs.

The graphical and sound oriented game components may be incorporated into a game presentation on the gaming machine 200 and presented to the player using the displays, 134 and 142 and the speaker 114. Game component information from the smart card may be stored in RAM memory on the master gaming controller 205, may be stored in a smart card data partition 225 of a hard drive 220, may be store in a non-volatile memory 235 or may be stored in some other memory location on the gaming machine. The game components used in the game presentation may be preloaded into the smart card at the time the player receives their smart card or may be downloaded to the card from a remote location while the smart card is in use at the gaming machine 200.

Alternatively, game configuration parameters and denomination selection parameters may be loaded on the smart card at the time the smart card is issued. The initial parameters on the smart card may be set by the casino or may be defined by the player. During game play, a player may insert their smart card into the gaming machine 200 using the smart card reader 124. After the smart card is inserted into the smart card reader 124, the smart card reader 124 may transfer game configuration parameters and denomination selection parameters to the master gaming controller 205 via the main communication board 210. Then, based on the configuration parameters stored on the smart card and downloaded to the gaming machine, certain game types, such as card games, spinning reel games, test games available only on certain gaming machines, or other specialty game types available on the gaming machine 200 may be displayed while other games available on the same gaming machine may not be displayed. To initiate game play on the gaming machine, the player may first select from among a number of displayed games available on the gaming machine.

While the player is playing one or more games on a particular gaming machine, a smart card inserted into the smart card reader 124 may regularly communicate with the gaming machine 200. For instance, while the smart card is inserted into the smart card reader 124, the smart card may receive regular updates of game play history information, such as money accepted into the gaming machine via the bill validator 130 and coin acceptor 128 or an amount wagered on a particular game, from the master gaming controller 205 on the gaming machine 200. The game play history information sent by the master gaming controller may be used to update game play history information stored on the smart card by one or more gaming applications executed on the smart card, such as the bonus game application, the voucher application, the paytable application and the progressive game application.

A smart card inserted into a smart card reader 124 may communicate with a master gaming controller 225 using communication protocols unique to smart cards, may use communication protocols common to gaming machines or combinations of both. For instance, a smart card may communicate with the gaming machine 200 using a Slot Accounting System (SAS) protocol or a Netplex communication protocol developed by IGT (Reno, Nev.). When a smart card is inserted into a gaming machine 200, the smart card may establish communications with the gaming machine in some standard communication protocol used by both the gaming machine 200 and the smart card. Then, the smart card may send the gaming machine a list of gaming applications and communication protocols supported by the smart card which may be used in a game play sequence on the gaming machine. Further, the gaming machine may send the smart card gaming machine identification information such as gaming machine serial number which may be used by the smart card to determine what gaming applications and communication protocols are supported by the gaming machine.

The smart card may communicate with other devices other than the gaming machine when inserted into the smart card reader 124. For example, via the main communication board 210 on the gaming machine, the smart card may communicate with one or more game service servers, such as server 245 and 250, connected to the gaming machine 200 via a LAN 215. The game service servers may provide one or more game services such as an accounting server, a bonus game server, a progressive game server, a player tracking server and a cashless system server. In addition, the smart card may communicate with devices in communication with the gaming machine via a wide area network such as the Internet 255.

By communicating with remote servers connected to a gaming machine, a smart card may augment the services provided by these remote servers in a distributed manner. For instance, player tracking services are usually only provided to gaming machines connected in a dedicated network to a player tracking server. Using the smart card, a player may engage in game play sequences on a plurality of gaming machine that are not connected to the dedicated communication network of a player tracking server and then engage in a game play sequence on a gaming machine connected to the player tracking server. When the smart card is inserted into a smart card reader on the gaming machine connected to the player tracking server, the smart card may contact the player tracking server and send game play information to the player tracking server about game play recorded on the smart card from game play sequences on gaming machines not connected to the player tracking server. The game play recorded on the smart card may be obtained using player tracking gaming instructions generated by a player tracking gaming application executed on the smart card. Thus, with the smart card, player tracking services may be extended to gaming machines not connected to the player tracking server. In a similar manner, using a smart card, other gaming services provided by a game service server may be extended to gaming machines not connected to the game service server.

The smart card may communicate with the gaming machine 200 via communication interfaces other than the smart card reader 124. For instance, a player may carry a portable wireless communication interface that accepts a smart card. Thus, the smart card inserted into the portable wireless communication interface may communicate with the gaming machine 200 using the wireless communication interface 240.

The functions of the smart card described above may be performed by other gaming devices. For instance, a player may carry a personal digital assistant (PDA) that executes gaming applications such as a bonus game application, a voucher application, a progressive game application and a paytable application. The PDA may communicate with the gaming machine via a wireless communication interface, such as 240. In the manner described above for the smart card, gaming applications executing on the PDA may generate gaming instructions containing information and commands to the gaming machine. The gaming instructions, from the PDA, may be executed by the gaming machine as part of a game play sequence on the gaming machine. There are many different types of PDAs from many different manufacturers. One example of a PDA that may be adapted for such use is the Palm VII from Palm, Inc., Santa Clara, Calif.

Specific embodiments of the present invention will now be described in which credits for playing a particular game or set of games are distributed and used to effect play of the designated game(s). These embodiments will be described with reference to a promotional card or device with which indicia of credit are associated. It should be noted that the promotional device may be any of a variety of devices including any of the instruments and mechanisms described above with reference to FIGS. 1 and 2 by which credit and other types of information may be communicated to a gaming machine.

Figure 4A:
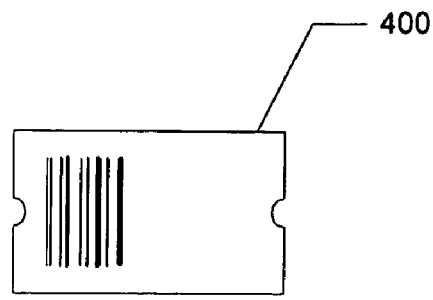
FIGS. 4A-4C show various exemplary embodiments of promotional devices according to the present invention.
Figure 4B:
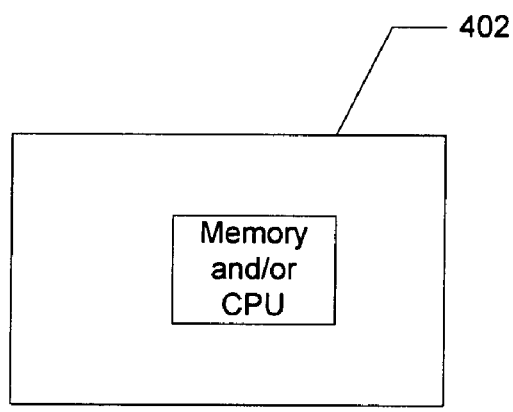

For example, a ticket voucher (e.g., ticket 120 of FIG. 1 or ticket 400 of FIG. 4A) printed by or for use with a gaming machine may have a bar code thereon which encodes a credit amount and identifies a specific gaming application or set of gaming applications for which the credit may be redeemed. Alternatively, the smart card described above (an example 402 of which is shown in FIG. 4B) could have similar game-specific credit information stored directly on the smart card or have information on the smart card which points to the game-specific credit information on some remote storage device, e.g., servers 245 and 250 of FIG. 2. According to specific embodiments in which smart cards are used to distribute game-specific credits, the provider of the credits has the option of disabling certain system features for play associated with the game-specific credits. That is, for example, it might be desirable to disable player tracking functions (in which a player accrues points for playing games) when the game-specific credits are redeemed.

Figure 4C:
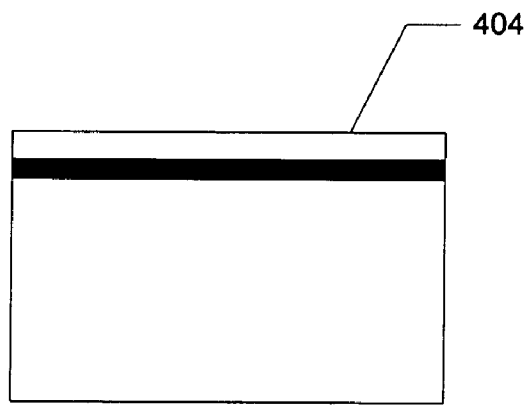

As yet another alternative, the game-specific credit information may be magnetically encoded in the magnetic strip of a promotional card (e.g., card 404 of FIG. 4C) which may be read by the gaming machine's card reader. According to a specific embodiment of the invention, such promotional cards include graphical elements on the cards which are specific to the game or games being promoted. These graphical elements may, for example, correspond to the graphical elements associated with the promoted game and are designed to generate interest in the promoted game. More generally, a wide variety of mechanisms are envisioned by which game-specific credits are distributed and used to enable operation of gaming machines. Therefore, the present invention should not be limited to the examples given.

Figure 3:
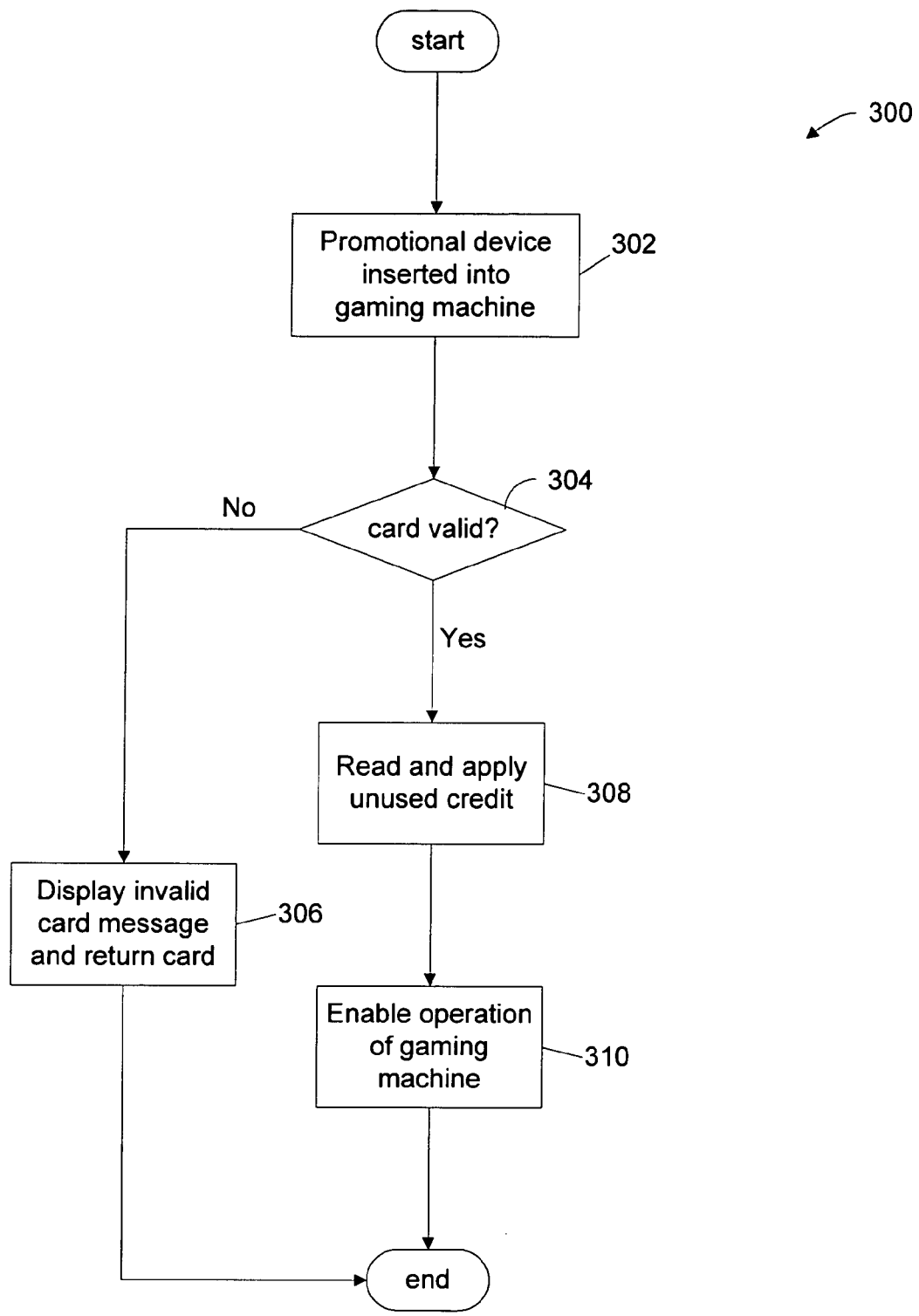
FIG. 3 is a flowchart illustrating redemption of game-specific credits according to a specific embodiment of the invention.

FIG. 3 is a flowchart illustrating redemption of game-specific credits according to a specific embodiment of the present invention. In this exemplary embodiment, the player has been provided with a promotional card having a magnetic strip which encodes information including player identification information for the specific player associated with the promotional device, some indicia of credit, e.g., $5, and identifying a specific game for which the credit may be redeemed. Such a card might be provided, for example, by a gaming establishment or gaming machine manufacturer for the purpose of promoting use of a newly deployed gaming machine to a specific group of players, such as high rollers, a tour group, etc. More specifically, such a promotional card might be distributed to selected players through mailings, emails, or the like, to encourage such players to visit the gaming establishment and play the promoted game. Promotional cards may also be distributed at a gaming establishment to promote additional or future play at specific gaming machines. For instance, a gaming machine may dispense a promotional card to a specific player. The promotional card can include indicia of credit, which can be applied to a specific gaming application on another gaming machine. In another example, a cashier may distribute promotional cards to specific players. The promotional cards can include indicia of credit and can be used at gaming machines offering specific gaming applications. According to some embodiments, the encoded information associated with a promotional card may identify multiple games for which the credit may be used. According to other embodiments, the encoded information may also indicate whether the credit for the game(s) identified may be used at a single gaming venue, or multiple venues associated with, for example, a chain of casinos associated with a particular operator.

When the player wishes to use the promotional card to play a specific gaming application, the player can insert the promotional card into the gaming machine. Upon insertion of the promotional card into a gaming machine (302), it is determined whether the encoded information corresponds to a gaming application associated with the gaming machine and whether any credit is left (304). Furthermore, it can be determined whether the player identification information associated with the promotional card is consistent with a secondary form of player identification provided to the gaming machine, in order to authenticate the player's identity. More particularly, the player inserting the promotional card into the gaming machine can be prompted to provide a secondary form of player identification, such as a player tracking card, a PIN number, biometric information, a driver's license, a smart card, a credit card, a wireless device, or the like. Various types of secondary forms of player identification can be used, such as those having magnetic strips, bar codes, or the like. The secondary form of identification can be compared to the player identification information associated with the promotional card. For instance, if a player tracking card is used as secondary form of identification, the player tracking number associated with the card can be compared to a player tracking number associated with the promotional device. If the player identification information matches the secondary form of player identification, then the player's identity can be deemed authenticated.

In some embodiments, the player identification information associated with the promotional card is stored in a database and information associated with the secondary form of player identification is stored in another database. In other embodiments, the player identification information associated with the promotional card and information associated with the secondary form of player identification are stored in the same database. In still other embodiments, the player identification information associated with the promotional card and information associated with the secondary form of player identification are stored in the same account (e.g. a player tracking account) in the same database. This information can be retrieved from these databases for comparison.

Accordingly, before the specific gaming application is presented, various conditions should be met. In some examples, these conditions include 1) authenticating the identity of the specific player associated with the promotional card, 2) detecting that the promotional card has some indicia of credit remaining on it, and 3) detecting that the promotional card is associated with the specific gaming application on the gaming machine. If one or more of these conditions is not satisfied, then the promotional card can be returned to the customer and an appropriate message can be displayed which indicates that the inserted card is not valid for this machine (306).

If, on the other hand, the player associated with the promotional device is authenticated and the encoded information on the card identifies one or more gaming applications associated with the gaming machine and there is unused credit (304), the amount of credit indicated on the card is read (308) and operation of the designated gaming application in a manner which corresponds to the credit value is enabled (310). In embodiments where multiple games are associated with the gaming machine, operation of the gaming machine may be restricted only to those gaming application identified by the promotional card. In addition, the credit value associated with the card may be restricted to being used to effect play of the intended game. That is, it will not typically be redeemable for cash. In some embodiments, the credit value associated with the card can be saved to a database that stores promotional information and/or player-specific information. For instance, the credit value can be saved to the player's player tracking account, which is stored in a database that is linked to a player tracking card or other secondary form of player identification information, as described above. In other examples, the credit value can be saved to a separate database storing promotional card information. In some applications, this database can be linked to a database storing player tracking account information. In yet other examples, the credit value can be saved across databases. More generally, information associated with a promotional card as well as information associated with a secondary form of player identification can be stored in one or more databases. For instance, information associated with a promotional card and information associated with a secondary form of player identification can be stored in the same database or in separate databases.

In embodiments in which a smart card (described above) is employed to implement the invention, the information on the smart card could identify the promoted gaming application, the amount of the credit, and the specific player entitled to apply the credit to the promotional gaming application. Alternatively, the smart card could merely provide player identification information or indicate that the player has a credit, additional information about which may be retrieved from a remote storage device. According to such an embodiment, the gaming machine would communicate with the remote storage device as described herein to effect the verification and crediting process described above with reference to FIG. 3.

In addition, and as described above, functions typically enabled by use of such a smart card may be disabled for game play associated with the redeemed credits. That is, the gaming venue may not desire to provide free use of a new gaming machine while simultaneously allowing the player to accrue points in the manner described above. Alternatively, the player tracking services could be altered to track play corresponding to the redeemed credits for tracking or other purposes.

Numerous embodiments of the present invention provide various benefits. For instance, by associating promotional devices with specific players, gaming establishments can track how these specific players use the promotional devices. Specifically, the gaming establishment can determine how many players were attracted to the gaming establishment by the promotional card, and the gaming establishment can determine which promotional games the players played, whether they won, how they used their credits, etc. In particular, a gaming establishment can track whether players used all of their credits in a single gaming session, and how many credits the player bet per play (i.e. card hand, spin, etc.). The gaming establishment can observe play on the specific gaming machines/applications associated with the promotional cards and can use this information to improve the games, their placement on the casino floor, and/or determine the level of demand for these games. Furthermore, players have the opportunity to try new games and keep their winnings from these games in some embodiments. This can be appealing to players because they can play the games for free and have a chance to win cash or prizes from these free games. At the same time, providing promotional cards to specific players can be appealing to gaming establishments because they can learn more about how players respond to promotional games, encourage the specific players to play these promotional games, and obtain information about how to improve these games.

While the invention has been particularly shown and described with reference to specific embodiments thereof, it will be understood by those skilled in the art that changes in the form and details of the disclosed embodiments may be made without departing from the spirit or scope of the invention. For example, specific embodiments of the invention have been described with reference to a gaming machine in which the various components of an associated gaming application are stored in the gaming machine itself. It will be understood, however, that the present invention may be implemented in distributed gaming environments in which the various objects associated with a gaming application may be stored in a variety of locations on a local or wide area network (e.g., the gaming machine and a remote gaming server) and/or shared among more than one gaming application.

It will also be understood that, according to some embodiments, use of the promotional devices embodied by the present invention may be restricted or expanded in a variety of ways. For example and as described above, a promotional device designed according to the invention may identify more than one game to which its credit may be applied, e.g., games provided by the same manufacturer. It should also be understood that the use of such a promotional device may additionally be limited to a single gaming establishment property or expanded to multiple properties in a chain or a particular geographic region. Management of promotional devices across multiple properties may be accomplished according to techniques described in commonly assigned, copending U.S. patent application Ser. No. 09/648,382 for CASHLESS TRANSACTION CLEARINGHOUSE filed on Aug. 25, 2000, and patent application Ser. No. 10/406,911 for CASHLESS TRANSACTION CLEARINGHOUSE filed on Apr. 2, 2003 the entire disclosures of which are incorporated herein by reference for all purposes.

According to still other embodiments, the information associated with a promotional device designed according to the invention need not be conveyed to the gaming system by insertion of the promotional device into a gaming machine. For example, information printed on a promotional ticket or card may be manually input into the system by the holder using any conventional type of user interface, e.g., a keypad or touch screen. Such a device may be useful where, for example, the gaming system is an Internet gaming system in which players participate using, for example, personal computers. In such an embodiment, the holder of the promotional card or ticket could input a string of alphanumeric characters associated with the card using his keyboard, in response to which a specific amount would be credited to that player for use in playing a specific game or set of games, or for use at a particular gaming site or set of gaming sites, in much the same way as described above with reference to FIG. 3.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A gaming machine, comprising:
   circuitry for receiving data from a promotional device in communication with the gaming machine, the circuitry configured to:
   retrieve, from the promotional device, information identifying an indicia of credit for use in wager-based gaming;
   retrieve, from the promotional device, information identifying a specific gaming application, the indicia of credit being limited to use only with instances of the specific gaming application; and
   retrieve, from the promotional device, player identification information for a specific player associated with the promotional device, and
   a processor configured to:
   generate play of a wager-based game;
   determine, based at least in part on the retrieved information identifying the specific gaming application, whether an instance of the specific gaming application is available for play on the gaming machine;
   authenticate, using the retrieved player identification information, the specific player associated with the promotional device;
   determine, based at least in part on the determination as to whether the instance of the specific gaming application is available for play, whether to apply the indicia of credit for use on the gaming machine; and
   when the processor determines that the specific gaming application is available and when the specific player is authenticated, indicate that the indicia of credit is available to be used for play of the specific gaming application.

2. The gaming machine of claim 1, wherein the processor is further configured to enable operation of the specific gaming application in accordance with the credit if the specific gaming application is available for play on the gaming machine and if the identity of the specific player is authenticated.

3. The gaming machine of claim 1, wherein the processor is configured to authenticate the specific player by determining whether the player identification information associated with the promotional device is consistent with a secondary form of player identification presented to the gaming machine.

4. The gaming machine of claim 3, wherein the secondary form of player identification presented to the gaming machine is a player tracking card, biometric information, a PIN number, a driver's license, a smart card, a credit card, a wireless device, or a combination thereof.

5. The gaming machine of claim 3, wherein the indicia of credit associated with the promotional device and information about the specific gaming application on the gaming machine to which the promotional device and the credit is limited is stored in a first database, and wherein information associated with the secondary form of player identification is stored in a second database.

6. The gaming machine of claim 5, wherein the first database and the second database are the same.

7. The gaming machine of claim 5, wherein the player identification information stored in the first database is accessible using information from the promotional device, and wherein the information associated with the secondary form of player identification stored in the second database is accessible using information from the secondary form of player identification.

8. The gaming machine of claim 7, wherein the first database and second database are accessible using a player tracking account number.

9. The gaming machine of claim 1 wherein the gaming machine is part of a gaming network which includes a remote storage device, at least part of the credit being stored in the remote storage device.

10. The gaming machine of claim 1 wherein the circuitry comprises one of a magnetic card reader, a bar code reader, and a wireless receiver.

11. The gaming machine of claim 1, wherein the player identification information is a player tracking account number.

12. The gaming machine of claim 1, wherein the processor is further configured to apply the indicia of credit for use on the gaming machine when it is determined that the specific gaming application is available for play on the gaming machine.

13. The gaming machine of claim 1, wherein the processor is further configured to not apply the indicia of credit for use on the gaming machine when it is determined that the specific gaming application is not available for play on the gaming machine.

14. A method for operating a wager-based gaming machine, comprising:
    retrieve, from a promotional device, information identifying an indicia of credit for use in wager-based gaming;
    retrieve, from the promotional device, information identifying a specific gaming application, the indicia of credit being limited to use only with instances of the specific gaming application;
    retrieve, from the promotional device, player identification information for a specific player associated with the promotional device; and
    prior to enabling operation of the specific gaming application on the wager-based gaming machine and applying the credit toward the specific gaming application:
    authenticating, using the retrieved player identification information, the specific player associated with the promotional device;
    determining, based at least in part on the retrieved information identifying the specific gaming application, whether an instance of the specific gaming application is available for play on the gaming machine;
    determining, based at least in part on the determination as to whether the instance of the specific gaming application is available for play, whether to apply the indicia of credit for use on the gaming machine; and
    when an instance of the specific gaming application is available for play on the gaming machine and when the specific player is authenticated, indicating that the indicia of credit is available to be used for play of the instance of the specific gaming application.

15. The method of claim 14, further comprising enabling operation of the specific gaming application on the gaming machine and applying the credit toward the specific gaming application if the specific player is authenticated and if the specific gaming application is available for play on the gaming machine.

16. The method of claim 14, further comprising when the specific gaming application is available on the gaming machine, refusing to apply the credit toward the specific gaming application if the specific player is not authenticated.

17. The method of claim 14, further comprising disabling operation of the specific gaming application on the gaming machine and refusing to apply the credit toward the specific gaming application if the specific gaming application is not associated with the gaming machine.

18. The method of claim 14, wherein authenticating the specific player includes determining that player identification information associated with the promotional device matches a secondary form of player identification presented to the gaming machine.

19. The method of claim 18, wherein the secondary form of player identification is a player tracking card, biometric information, a PIN number, a driver's license, a smart card, a credit card, a wireless device, or a combination thereof.

20. The method of claim 18, wherein the player identification information is stored in a first database, and wherein information associated with the secondary form of player identification is stored in a second database.

21. The method of claim 20, wherein the first database and the second database are the same.

22. The method of claim 20, wherein the player identification information stored in the first database is accessible using information from the promotional device, and wherein the information associated with the secondary form of player identification stored in the second database is accessible using information from the secondary form of player identification.

23. The method of claim 14, wherein the gaming machine is part of a gaming network having at least one gaming server associated therewith, and wherein enabling operation of the specific gaming application comprises employing objects associated with the specific gaming application distributed among the gaming machine and the at least one gaming server.

24. The method of claim 23 wherein the network is one of a local area network and a wide area network.

25. The method of claim 14 wherein communicating with the promotional device comprises receiving the promotional device in a receptacle associated with the gaming machine.

26. The method of claim 14 wherein communicating with the promotional device comprises receiving a wireless transmission from the promotional device.

27. The method of claim 14 further comprising identifying at least one gaming venue in which the promotional device may be employed.

28. The method of claim 27 wherein the at least one gaming venue comprises multiple related gaming venues.

29. The method of claim 14, further comprising applying the indicia of credit for use on the gaming machine when it is determined that the specific gaming application is available for play on the gaming machine.

30. The method of claim 14, further comprising not applying the indicia of credit for use on the gaming machine when it is determined that the specific gaming application is not available for play on the gaming machine.

31. A promotional device that effects operation of a specific gaming application for a wager-based game on a gaming site over the Internet, when the specific gaming application is available for play on the gaming site, the promotional device configured to store information comprising:
  1) game-specific indicia of credit, the game-specific indicia of credit being limited to use only with instances of the specific gaming application,
  2) information used to identify a specific player to which operation of the specific gaming application and application of the credit is limited and
  3) information used to identify the specific gaming application,
  wherein the information stored on the promotional device, when transmitted from a personal computer to a gaming site over the Internet, allows the gaming site to determine 1) an identity of the specific player to be authenticated and 2) an availability of an instance of the specific gaming application to be determined prior to the indicia of credit being used on the gaming site for only the specific gaming application.

32. A promotional device that effects operation of a specific gaming application on a wager-based gaming machine, when an instance of the specific gaming application is available for play on the wager-based gaming machine that is in communication with the promotional device, the promotional device configured to store information comprising:
  game-specific indicia of credit, the game-specific indicia of credit being limited to use only with instances of the specific gaming application;
  information used to identify a specific player to which operation of the specific gaming application and application of the indicia of credit is limited; and
  information used to identify the specific gaming application,
  wherein the information stored on the promotional device, when transmitted to the wager-based gaming machine, allows the wager-based gaming machine to determine 1) an identity of the specific player to be authenticated and 2) an availability of an instance of the specific gaming application, the identity and the availability to be determined prior to the indicia of credit being used on the wager-based gaming machine for only the specific gaming application.

* * * * *